United States Patent [19]

Camier et al.

[11] Patent Number: 5,242,114
[45] Date of Patent: Sep. 7, 1993

[54] GLASS WASHING APPARATUS FOR A MOTOR VEHICLE

[75] Inventors: Jean-Pierre Camier, Bobigny; Bernard Bigot, Ermont, both of France

[73] Assignee: Valeo Vision, Bobigny Cedex, France

[21] Appl. No.: 870,888

[22] Filed: Apr. 20, 1992

[30] Foreign Application Priority Data

Apr. 25, 1991 [FR] France .................. 91 05115

[51] Int. Cl.$^5$ .................. B05B 1/10
[52] U.S. Cl. .................. 239/284.2
[58] Field of Search .......... 239/281, 284.2, 203-206

[56] References Cited

U.S. PATENT DOCUMENTS

| 1,769,944 | 7/1930 | Crisp | 239/281 X |
| 1,919,196 | 7/1933 | Brooks | 239/206 |
| 2,331,373 | 10/1943 | Campbell | 239/281 X |
| 3,263,929 | 8/1966 | Seablom | 239/204 |
| 3,656,691 | 4/1972 | Norstrand | 239/284.2 |
| 4,272,023 | 6/1981 | Georgiev et al. | 239/204 |
| 4,479,611 | 10/1984 | Galvis | 239/205 |

FOREIGN PATENT DOCUMENTS

| 2523909 | 3/1982 | European Pat. Off. |
| 0262402 | 8/1987 | European Pat. Off. |
| 2455294 | 5/1976 | Fed. Rep. of Germany ... 239/284.2 |
| 1480348 | 7/1977 | United Kingdom ............ 239/284.2 |

Primary Examiner—Andres Kashnikow
Assistant Examiner—Kevin Weldon
Attorney, Agent, or Firm—Morgan & Finnegan

[57] ABSTRACT

A motor vehicle headlamp glass washing apparatus comprises a jet nozzle mounted on a retractable jet carrier and supplied selectively from a source of washing liquid under pressure. The jet carrier comprises a variable volume chamber, which is defined by a fixed element and a movable element which slides on the fixed element and which carries the jet nozzle. A spring acts between the fixed and movable elements to bias the movable element into a retracted position. Supply of liquid under pressure to the variable volume chamber initially moves the movable element against the action of the spring into a deployed position, and then supplies the liquid to the jet nozzle.

The fixed element is a tube open at a free end and connected to the liquid source at its other end, the movable element comprising a closed body having an internal space communicating with the jet nozzle. This space is delimited by a first part sliding sealingly on the outside of the tube, and a second part penetrating into the tube so as to close the latter and movable outwardly in the tube under the action of the pressurized liquid so as to bring the interior of the tube into communication with the internal space in the movable element.

20 Claims, 1 Drawing Sheet

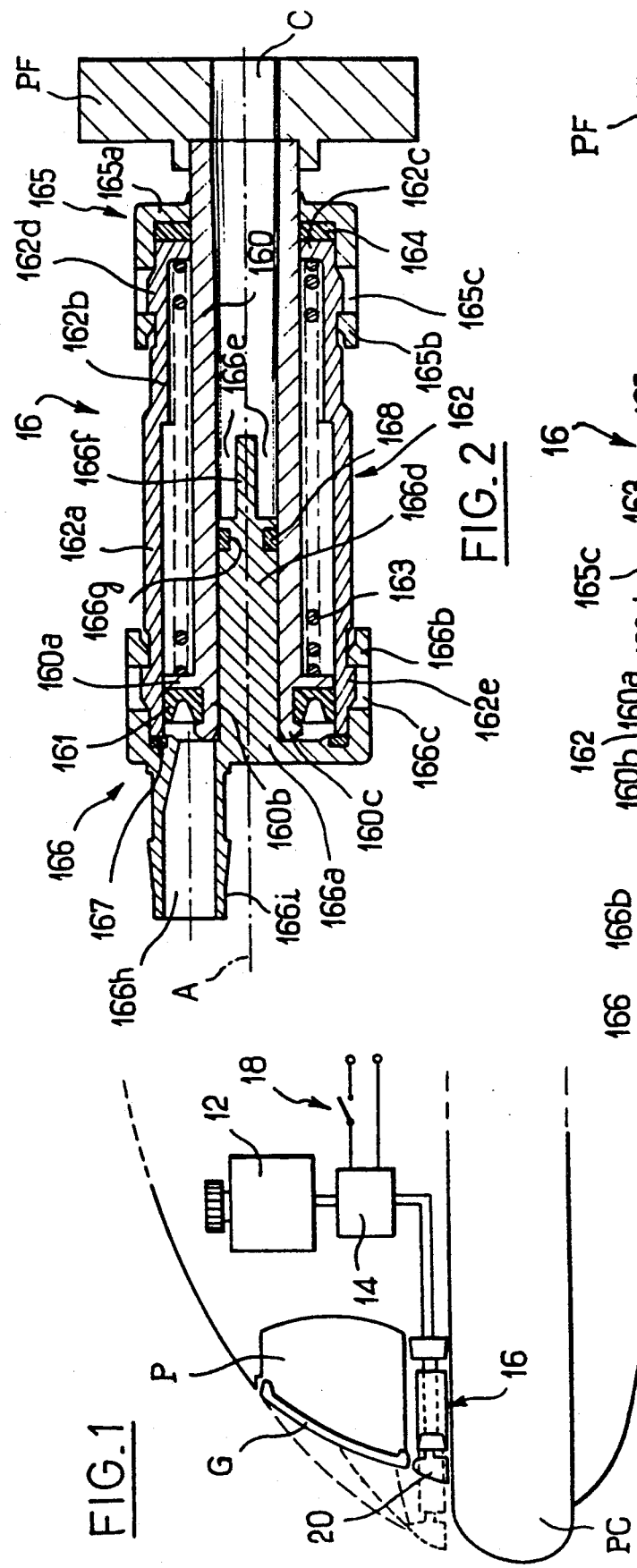
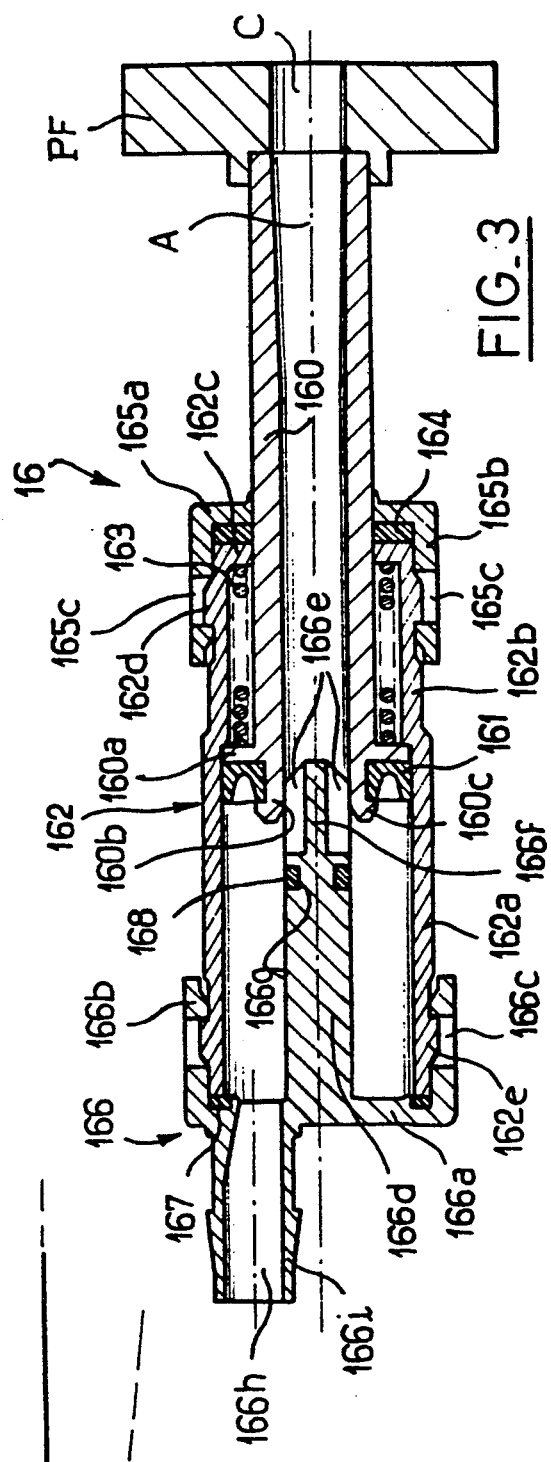

GLASS WASHING APPARATUS FOR A MOTOR VEHICLE

FIELD OF THE INVENTION

The present invention relates generally to apparatus for washing motor vehicle headlamp glasses.

BACKGROUND OF THE INVENTION

Such a washing apparatus conventionally comprises a jet nozzle which is supplied with washing liquid under pressure and which is fixed in a position spaced in front of, and below, the headlamp glass. Thus such a jet nozzle is commonly incorporated in the front fender or cross beam of the vehicle.

It is also well known that, in order to obtain maximum washing efficiency, the jet nozzle must be arranged as far as possible in front of the headlamp glass, in such a way that the droplets of liquid will impinge on the glass at an angle of incidence which is as large as possible.

In addition, the glasses of modern headlamps, which may follow the "diving" front profile of the vehicle, make it necessary to locate the jet nozzles further and further in front of the headlamp glass. Since such jet nozzles are conventionally incorporated in upward projections carried by the fenders, this gives rise to drawbacks in connection with safety, aerodynamics and aesthetics.

It has previously been proposed, in order to overcome these drawbacks, to provide a retractable jet carrier carrying the jet nozzle and being of a type that comprises a jack, the internal movable piston of which carries the nozzle at its free end. The chamber of the jack is supplied directly with the washing liquid, and the pressure of the latter first causes the jack to operate so as to move the jet nozzle into a position in which it projects forward, by displacement of the piston, after which it causes the nozzle to be supplied with the liquid so as to spray the glass itself. Such arrangements are described in the specifications of the French published patent application No. FR 2 523 909A and European published patent application No. Ep 0 262 402A.

However, these known types of jet carriers have a certain number of drawbacks themselves. By virtue of their particular construction, the sealing zone between the two movable members constituting the cylinder and piston of the jack is exposed to the front of the vehicle, so that there is a major risk of deterioration which leads to leakage of washing liquid, or even to jamming of the piston. The apparatus described in the above mentioned European patent document includes, besides a seal between the cylinder and piston of the jack, a protective bellows which completely surrounds the jack piston in that part of the latter which is outside the cylinder. The selling cost is thus increased, and such a bellows is considered unattractive aesthetically.

Besides the foregoing, these two known apparatuses necessitate complicated means for ensuring the initial extension of the jack without the jet nozzle being supplied with liquid under pressure until the jack is extended to the required position.

DISCUSSION OF THE INVENTION

An object of the present invention is to overcome the above mentioned drawbacks of the prior art, by proposing a glass washing apparatus having a jet carrier in which the sealing means are more effective and better protected from the outside environment than in the prior art. A further object of the invention is to ensure that the jet nozzle will be supplied with washing liquid after it has been put in its working position by the pressure of the said liquid, all in an extremely simple and economical manner.

To this end, according to the invention there is provided a glass washing apparatus for a motor vehicle headlamp glass, of the kind comprising a jet nozzle mounted on a retractable jet carrier and supplied selectively and under pressure with a washing liquid from a source of such liquid, the jet carrier comprising a variable volume chamber defined by a fixed element and a movable element arranged to slide with respect to the fixed element and carrying the jet nozzle, with a resilient return means acting between the fixed element and the movable element, with the supply to the said variable volume chamber of washing liquid under pressure initially causing movement of the movable element against the return means, into a deployed position, and then causing the washing liquid to be applied to the jet nozzle, characterised in that the fixed element comprises a tube which is open at a free end and connected at its opposite end to the source of washing liquid under pressure, and in that the movable element comprises a body which is essentially closed, having an internal space which is in communication with the jet nozzle and which is delimited by a first part disposed on the outside of the said tube in sealing relationship with its outer surface, and by a second part which is adapted to penetrate into the tube so as to close off the latter, and to tend to move out of the tube under the action of the washing liquid under pressure whereby to establish communication between the interior of the tube and the said internal space.

Further aspects, objects and advantages of the present invention will appear more clearly from a reading of the detailed description of a preferred embodiment of the invention which follows, given by way of non-limiting example only and with reference to the accompanying drawings.

BRIEF DESCRIPTION OF THE DRAWINGS

FIG. 1 is a diagrammatic general assembly view of a glass washing apparatus with a retractable jet carrier in accordance with the invention.

FIG. 2 is a detailed view in vertical axial cross section of the jet carrier in the apparatus shown in FIG. 1, with the jet carrier shown in a first position.

FIG. 3 is a view similar to FIG. 2, but showing the jet carrier in a second position.

DESCRIPTION OF A PREFERRED EMBODIMENT OF THE INVENTION

Reference is first made to FIG. 1, which shows an apparatus for washing a headlamp glass including, in a known manner, a reservoir 12 for washing liquid, a pump 14 connected upstream to the reservoir and downstream to a retractable jet carrier 16, together with an electrical interruptor 18, for example a relay, which is controlled from the cabin of the vehicle for starting and stopping the apparatus by selective electrical control of the pump at the will of the driver.

The retractable jet carrier carries at that one of its ends which faces forward a jet nozzle 20, which may be of any appropriate type and which is mounted in the present example between the lower edge of the glass G of the headlamp P of the vehicle, and the fender PC. It may of course be arranged in any other appropriate place, and in particular it may be incorporated in the fender.

When the pump 14 is not supplied with electric current, no washing liquid pressure is applied to the jet carrier 16, and the latter is then in the retracted position shown in full lines in FIG. 1, in which the jet nozzle is substantially flush with the lower edge of the glass G. When the pump is energised, and the washing liquid under pressure is applied to the jet carrier, the latter is deployed (as will be described in more detail later in this description), in order to put the jet nozzle 20 into a position in which it is situated in front of the glass G, this position being indicated in broken lines in FIG. 1.

Referring now to FIGS. 2 and 3, one particular preferred embodiment of the jet carrier 16 itself will now be described. A fixed conduit or element comprising a hollow tube or bar 160, having an essentially horizontal axis, is secured to one end (the right hand end in the drawings) to an appropriate fixed part PF of the vehicle, which includes a duct C for feeding the washing liquid into the tube 160.

At its opposite end (the left hand end in the drawings), the tube 160 has a peripheral collar portion 160a projecting radially outwards, beyond which the tube 160 has a portion 160b of reduced diameter terminating in a bead 160c, which defines a slight terminal increase in the external diameter. Between the collar portion 160a and the bead 160c, a sealing ring 161, having a cross section which is generally in the form of a U, is trapped. The ring 161 comprises two lips extending away from the collar portion.

The internal diameter of the tube 160 is preferably constant over its whole length.

A member 162, generally in the form of a sleeve, extends coaxially with the tube 160 and comprises an outer wall or first portion or part 162a, the internal diameter of which is slightly greater sleeve member 162 is closed over the bar 160 at the free end of the sleeve member by a terminal portion comprising a radial portion 162c having a circular opening, the diameter of which is substantially equal to the diameter of the tube 160. A helical compression spring 163, which is preferably precompressed, is mounted between the second portion 162b of the sleeve member and the tube 160, bearing at a first end on the face of the collar portion 160a opposed to the seal 161, and at its second end on the radial or terminal portion 162c of the sleeve member.

Sealing between the tube 160 and the sleeve member 162 is provided by means of a third seal comprising a sealing ring 164 which is applied against the outer face of the radial portion 162c of the sleeve member, and which is held in compression by a cap 165 having a radial portion 165a, through which the tube 160 passes, and an axial cylindrical portion 165b. The axial cylindrical portion 165b is formed with apertures 165c, in which locking teeth 162d are engaged. The teeth 162d project from the external surface of the second part 162b of the sleeve member, and may for example be integral with the latter. Preferably, assembly of the cap 165 on the sleeve member 162 is carried out by force-fitting, with elastic expansion of the portion 165b of the cap until the teeth 162d penetrate into the apertures 165c. In order to facilitate this movement, the teeth 162d are formed with ramps on their side facing towards the right in the drawings.

An end cover member 166 is fixed over the free end of the first portion 162a of the sleeve member. The cover member 166 has a radial masking portion 166a and an axial cylindrical portion 166b in which apertures 166c are formed. A set of teeth 162e, integral with, and projecting from, the outer face of the first portion 162a of the sleeve member, engage in these apertures 166c. As with the cap 165, the cover member 166 is force-fitted with resilient expansion of its portion 166b, until the teeth 162e penetrate into the apertures 166c. A further sealing ring 167 is provided between the terminal face of the sleeve member and the cover member 166, being held in position by means of a circular rib which is formed on the inner face of the masking portion 166a of the cover member.

A central portion or second part comprising a solid bar 166d, having a diameter substantially equal to the internal diameter of the tube 160, extends axially inwardly (i.e. towards the right in the drawings) from the central zone of the masking portion 166a. The bar 166d has a set of slots 166e at its free end. In this example there are four of these slots 166e, separated by axial ribs 166f defining a cruciform shape in cross section and extending the bar 166d. The ribs 166f fit accurately in the circular cross section of the tube 160. The ribs 166f are preferably formed with free terminal edges which are inclined as shown, in such a way as to facilitate entry of the bar 166d into the tube 160 during fitting of the cover member 166 as mentioned above.

The bar 166d also includes, close to its end having the slots 166e, a peripheral groove 166g in which a sealing ring 168 (for example an O-ring) is received. It will be noted that the axial length of the second portion 162b of the sleeve member, and the length of the bar 166d, are so chosen that, when the collar portion 160a of the tube 160 comes into abutment against the internal shoulder of the sleeve member that separates its first and second portions 162a and 162b, the terminal ribs 166f of the bar 166 extend only partly into the interior of the tube 160, leaving the slots 166e delimited by these ribs to provide communication between the interior of the tube 160 and the cavity which is defined between the first portion 162a of the sleeve member and the bar 166d itself.

Finally, a duct 166h extends outwardly (i.e. towards the left in the drawings) from the radial masking portion 166 a of the cover member 166, and is arranged to be connected to the jet nozzle 20, the body of which is secured on to the cover member 166, preferably by being appropriately gripped on the outside of the wall 166i of the duct.

The jet carrier described above operates in the following way. When the pump of the washing apparatus is stopped, no fluid pressure is applied to the jet carrier through the inlet duct C. The spring 163 tends to adopt its expanded position, and, bearing on the fixed collar portion 160a, it biases the sleeve member 162 towards the right in the drawings, acting on the radial terminal portion 162c of the latter, until the portion 166a of the cover member comes into abutment against the free end of the tube 160. This is the retracted position shown in FIG. 2, corresponding to the position shown in full lines in FIG. 1. It will be observed that the bar 166d penetrates over a substantial distance into the tube 160, and therefore closes it off.

It will also be noticed that the internal space within the liquid feed tube 160 is separated from the outside by a path in which the seals 167, 161 and 164 are all interposed. This guarantees virtually perfect sealing and prevents, in particular, any siphoning action which would tend to drain the reservoir 12.

When the washing liquid is now put under pressure and applied to the jet carrier, the variable volume chamber such as is defined by the tube 160 and the free end of the bar 166d is subjected to this pressure. The bar 166d, and with it the cover member 166 and sleeve member 162, thus tends to be urged axially away against the force exerted by the spring 163, so as to be displaced towards the left as shown in the Figures. This movement is of course accompanied by compression of the spring 163.

The bar 166d thus moves progressively out of the tube 160, until the slots 166e, reaching the end of the tube 160, begin to establish communication between the interior of the latter and the annular space lying between the sleeve member 162 and the bar 166d. The pressures on each side of this communication passage become stabilised in equilibrium, so that the sleeve member 162 and cover member 166 then remain in the position shown in FIG. 3, which corresponds to the deployed position indicated in broken lines in FIG. 1. The liquid under pressure, having penetrated into the annular space mentioned above, is now applied to the jet nozzle 20 through the duct 166h, so that the glass G of the headlamp is then subjected to the jet of washing liquid from the nozzle in its advanced position.

It will be understood that the above mentioned fluid communication through the slots 166e is established without the bar 166d fully leaving the interior of the tube 160, so that there is no risk of jamming by misalignment when the pressure of washing liquid is removed. The jet carrier is then able to return to the retracted position shown in FIG. 2.

In the deployed position of the jet carrier, the actions of the sealing rings 161 and 164 combine to prevent any leakage of liquid whatever It will also be noticed that in the deployed position and also in the retracted position, there is no critical or fragile zone in the jet carrier, and in particular there is no transition between fixed and movable members at which sealing is imperative, and which would be directly exposed towards the front of the vehicle. This ensures extremely reliable and durable sealing generally.

The present invention is of course in no way limited to the particular embodiment described above and shown in the drawings. The person skilled in the art will be able to apply to it any variation or modification in accordance with the spirit of the invention. In particular, the configuration of the free end of the bar 166d may take any suitable form whatever. In addition, although the various elements of the jet carrier as defined above have been indicated as bodies of revolution about the general axis A, any appropriate cross section may be chosen for these elements. In particular, they may have flat pins or the like in order to prevent any accidental rotation of the movable part of the jet carrier with respect to its fixed part.

What is claimed is:

1. A motor vehicle headlamp glass washing apparatus comprising: a source of pressurized washing liquid; a jet carrier; means connecting the liquid source to the jet carrier for supply of said liquid under pressure to the latter; and a jet nozzle carried by the jet carrier, the jet carrier comprising a movable element and a fixed element carrying the movable element for sliding movement of the movable element on the fixed element, the two elements together defining a variable volume internal chamber between them, the jet nozzle being carried by the movable element, and the jet carrier further including resilient return means mounted between the two elements whereby to bias the movable elements into a retracted position on the fixed element, wherein the fixed element comprises a tube having an open front end and a rear end connected to the means for supplying said liquid from said source under pressure, the movable element comprising a first part arranged on the outside of said tube in sealing relationship with the latter by sandwiching said tube wall between said first and second parts, the region between the free end of said first part and the adjacent portion of said tube defining a sealing zone which faces said rear end, and a second part cooperating with the tube for telescopically penetrating into said tube whereby to close off the latter, said second part having a free end, the outer surface of said second part having a longitudinal slot extending to its said free end wherein the longitudinal dimension of said slot is less than the longitudinal dimension of said second part, said first and second parts together defining an annular internal space of said movable element communicating with the jet nozzle, whereby introduction of said liquid under pressure from the source into said tube urges said second part to telescopically move out of said tube, thereby moving the movable element into a deployed position and bringing the interior of said tube into communication with said internal space via said slot and thence bringing the interior of said tube into communication with the jet nozzle.

2. Apparatus according to claim 1, wherein the said tube has an external collar portion, the said first part of the movable element has a terminal portion, and the said return means comprises a compression spring mounted between the collar portion and the said terminal portion.

3. Apparatus according to claim 2, wherein the terminal portion of the movable element has an internal surface defining a shoulder, the collar portion being arranged to abut against said compressed spring which abuts the said shoulder in the deployed position whereby to constitute a stop mean for limiting the travel of the movable element on the fixed element.

4. Apparatus according to claim 1, further including a first seal arranged close to the free end of the said tube between the latter and the said first part of the movable element.

5. Apparatus according to claim 4, wherein said first seal is a double-lipped ring.

6. Apparatus according to claim 1 wherein the jet carrier further includes a second seal surrounding said second part close to its free end so that said slot is disposed between said second seal and free end of said second part, said second seal cooperating with an internal surface of said tube.

7. Apparatus according to claim 1, wherein the said first part of the movable element is defined by a sleeve member, the movable element further including a cover member closing the said sleeve member so as to define the said internal space, and a bar projecting from the said cover member whereby to define the said second part of the movable element.

8. Apparatus according to claim 7, wherein the said cover member is formed with a duct communicating with the jet nozzle.

9. Apparatus according to claim 1, wherein the jet carrier further includes a cap, the movable element having a terminal portion and the jet carrier further including a third seal compressed between the said cap and terminal portion, with the said seal being in contact with the outer surface of the said tube.

10. Apparatus according to claim 1, wherein said slot establishes, communication between the interior of the tube and said internal space while said second part is still partially engaged within the tube.

11. Apparatus according to claim 10, wherein the free end of said second part is formed with ribs defining a cruciform cross section so as to define four said slots between them.

12. A jet carrier for a motor vehicle headlamp glass washing apparatus including a source of pressurized washing liquid, means connecting the liquid source to the jet carrier for supply of the liquid under pressure to the jet carrier, a jet nozzle carried by the jet carrier, the jet carrier comprising:

a fixed tubular conduit having a rear end connected to the means for supplying the pressurized washing liquid, and an open front end;

a movable element having a central longitudinal portion with a free end which is slidingly receivable through said open front end into the interior of said fixed conduit, said movable element further having an outer cylindrical wall concentric with said central portion so that, when said central portion is received in said fixed conduit, said central portion, fixed conduit and outer wall form a telescopic assembly wherein the wall of said fixed conduit is sandwiched between said central portion and outer wall, said front end of said fixed conduit and the cylindrical space between said outer wall and central portion defining a variable volume chamber, the jet nozzle being carried by said variable volume chamber, the region between the free end of said outer wall and the adjoining portion of said fixed conduit defining a sealing zone, said sealing zone facing said rear end of said fixed conduit;

resilient return means mounted between said fixed conduit and movable element to bias said free end of said central portion toward said rear end of said fixed conduit whereby said central portion is urged into the interior of said fixed conduit; and a longitudinal slot formed on the outer surface of said central portion, said slot extending to said free end of said central portion and having a longitudinal dimension which is less than the longitudinal dimension of said central portion so that introduction of the pressurized liquid into said fixed conduit urges said central portion to telescopically slide out of said fixed conduit thereby moving said movable element into a deployed position wherein said slot communicates with said variable volume chamber thereby bringing the interior of said fixed conduit into communication with the jet nozzle.

13. A jet carrier as set forth in claim 12 wherein said fixed conduit has an external collar portion, said outer wall has a terminal portion, and said return means comprises a compression spring mounted between said collar portion and said terminal portion.

14. A jet carrier as set forth in claim 13, wherein said terminal portion has an internal surface defining a shoulder, said compressed spring being arranged to abut against said collar portion and shoulder in the deployed position to constitute a stop means for limiting travel of said movable element on said fixed conduit.

15. A jet carrier as set forth in claim 12, and further comprising a first seal disposed between said fixed conduit and outer wall, said first seal being close to said front end of said fixed conduit, said first seal comprising a double-lipped ring.

16. A jet carrier as set forth in claim 12, and further comprising a second seal surrounding said central portion close to its free end so that said slot is disposed between said second seal and free end, said second seal cooperating with the internal surface of said fixed conduit.

17. A jet carrier as set forth in claim 12 wherein said outer wall is defined by a sleeve member, said movable element further comprising a cover member closing said sleeve member to define said variable volume chamber, and said central portion is defined by a bar projecting from said cover member.

18. A jet carrier as set forth in claim 12 wherein said cover member is formed with a duct communicating with the jet nozzle.

19. A jet carrier as set forth in claim 12 wherein said slot establishes communication between the interior of said fixed conduit and said variable volume chamber while said central portion is engaged with said fixed conduit.

20. A jet carrier as set forth in claim 19 wherein said free end of said central portion is formed with ribs defining a cruciform cross section to define four of said slots between them.

* * * * *

UNITED STATES PATENT AND TRADEMARK OFFICE
CERTIFICATE OF CORRECTION

PATENT NO. : 5,242,114
DATED : September 7, 1993
INVENTOR(S) : Jean-Pierre Camier and Bernard Bigot It is certified that error appears in the above-indentified patent and that said Letters Patent is hereby corrected as shown below:

Claim 3, col. 6, line 42, change "mean" to --means--.

Claim 18, col. 8, line 36, change "12" to --17--.

Signed and Sealed this

Tenth Day of May, 1994

Attest:

BRUCE LEHMAN

Attesting Officer    Commissioner of Patents and Trademarks